US007648284B2

(12) United States Patent
Norimatsu

(10) Patent No.: US 7,648,284 B2

(45) Date of Patent: Jan. 19, 2010

(54) BEARING APPARATUS FOR A WHEEL OF VEHICLE

(75) Inventor: Takayuki Norimatsu, Shizuoka-ken (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 11/130,346

(22) Filed: May 16, 2005

(65) Prior Publication Data

US 2005/0254741 A1 Nov. 17, 2005

(30) Foreign Application Priority Data

May 17, 2004 (JP) ............................. 2004-145794

(51) Int. Cl.
*F16C 13/00* (2006.01)

(52) U.S. Cl. ...................................................... 384/544

(58) Field of Classification Search ................. 384/544, 384/589, 492; 29/898.062, 898.07

See application file for complete search history.

(56) References Cited

U.S. PATENT DOCUMENTS

| | | | | |
|---|---|---|---|---|
| 4,835,829 | A * | 6/1989 | Welschof et al. | 29/894.361 |
| 5,352,046 | A * | 10/1994 | Ward | 384/492 |
| 5,911,458 | A * | 6/1999 | Bywalez et al. | 29/898.062 |
| 5,974,665 | A * | 11/1999 | Frielingsdorf et al. | 29/894.361 |
| 6,170,919 | B1 * | 1/2001 | Hofmann et al. | 301/105.1 |
| 6,622,377 | B1 * | 9/2003 | Johnson et al. | 29/724 |
| 6,669,374 | B2 * | 12/2003 | Miyazaki | 384/537 |
| 2004/0101223 | A1 * | 5/2004 | Baker et al. | 384/544 |

FOREIGN PATENT DOCUMENTS

| | | |
|---|---|---|
| DE | 4142313 A1 * | 6/1993 |
| JP | 2000-198304 | 7/2000 |
| JP | 2001-138704 | 5/2001 |
| JP | 2002-061660 | 2/2002 |
| JP | 2005098475 A * | 4/2005 |

* cited by examiner

*Primary Examiner*—Thomas R Hannon

(74) *Attorney, Agent, or Firm*—Harness, Dickey & Pierce, P.L.C.

(57) ABSTRACT

A vehicle wheel bearing apparatus for supporting a driven wheel of a vehicle has an outer member formed with double row outer raceway surfaces on its inner peripheral surface. An inner member includes a wheel hub with an integrally formed wheel mounting flange at one end of the inner member. A cylindrical portion axially extends from the wheel mounting flange. At least one inner ring, formed with at least one of double row inner raceway surfaces, opposes the double row outer raceway surfaces. The inner ring is adapted to be press-fit onto the cylindrical portion of the wheel hub. Double row rolling elements are freely rollably contained between the outer and inner raceway surfaces, respectively, of the outer and inner members. The inner ring is axially immovably secured relative to the wheel hub by a caulked portion. The caulked portion is formed by plastically deforming the end of the axially extending cylindrical portion radially outward. A partition wall is formed in the axially extending cylindrical portion of the wheel hub at a portion subjected to a load applied to at least the inner raceway surface of an inboard side of the double row inner raceway surfaces. A hollow portion is formed within the cylindrical portion at a portion outboard from the partition wall.

5 Claims, 4 Drawing Sheets

Prior Art

BEARING APPARATUS FOR A WHEEL OF VEHICLE

CROSS-REFERENCE TO RELATED APPLICATION

This application claims priority to Japanese Patent Application Nos. 2004-14594, filed May 17, 2004, which application is herein expressly incorporated by reference.

FIELD OF THE INVENTION

The present invention relates to a vehicle wheel bearing apparatus to support a driven wheel of a vehicle, such as an automobile, rotatable relative to its suspension apparatus. The invention improves the strength and durability of a wheel hub and an inner ring press-fit on the wheel hub used in the vehicle wheel bearing apparatus.

BACKGROUND OF THE INVENTION

Vehicle wheel bearing apparatus has advanced not only in reducing its manufacturing cost but in reducing its weight and size in order to improve fuel consumption. In these bearing apparatus, a wheel hub and a double row rolling bearing are formed as a unit. This is known as a representative example of a so-called third generation type. Here, each of the inner and outer members is formed with a flange. One of the inner raceway surfaces of the double row rolling bearing is formed directly on the wheel hub. The other inner raceway surface is formed on a separate inner ring which is press-fit onto the wheel hub.

FIG. 4 illustrates a vehicle wheel bearing apparatus which rotatably supports the wheel relative to the suspension apparatus of the third generation type of the prior art. An outer member 51, an inner member 54, including a wheel hub 52 and an inner ring 53 press-fit onto the wheel hub 52, and double row rolling elements 55 and 55, contained between the outer and inner members 51 and 54, form the bearing apparatus. The wheel hub 52 is integrally formed at one end with a wheel mounting flange 56. The flange 56 mounts a vehicle wheel (not shown) and has an inner raceway surface 52 on its outer circumferential surface. A cylindrical portion 52*b* axially extends from the inner raceway surface 52*a*. Hub bolts 57, to secure the wheel, are arranged, via an equidistant space, along the circumference of the wheel mounting flange 56. The inner ring 53, formed on its outer surface with an inner raceway surface 53*a*, is press-fit on the cylindrical portion 52*b* of the wheel hub 52. The inner ring 53 is secured on the wheel hub 52 by a caulked portion 52*c*. The caulked portion 52*c* is formed by plastically deforming the end of the axially extending cylindrical portion 52*b* radially outward to prevent the inner ring 53 from slipping off the wheel hub 52.

The outer member 51 is integrally formed with a body mounting flange 51*b*. The outer member 52 has double row outer raceway surfaces 51*a* and 51*a* on its inner circumferential surface. Double row rolling elements 55 and 55 are freely rollably contained between the double row outer raceway surfaces 51*a* and 51*a* and the opposed inner raceway surfaces 52*a* and 53*a*.

The wheel hub 52 is made by forging carbon steel, including carbon of 0.40~0.80% by weight, and surface hardening it by high frequency induction quenching in a region from the base of the wheel mounting flange 56 to the cylindrical portion 52*b* through the inner raceway surface 52*a*. However, the caulked portion 52*c* remains in its rare condition as having its surface hardness after forging. On the other hand, the inner ring 53 is made of high carbon chrome bearing steel such as SUJ 2 and is hardened to its core by quenching.

Accordingly it is possible to realize a low cost vehicle wheel bearing apparatus that has a sufficient durability to prevent a generation of damages such as cracks at the caulked portion 52*c*. A through bore 58 is formed in the center of the wheel hub 52 which also realizes weight reduction of the wheel hub 52 and reduction in manufacturing cost by commonly using the wheel hub 52, after forging between structures of the bearing apparatus, to support a driving wheel and to support a driven wheel. See, Japanese Laid-open Patent Publication No. 2002-61660.

In the prior art vehicle wheel bearing apparatus described above, since the wheel hub 52 is formed with the through bore 58 at the center of the wheel hub 52, it is possible to reduce the weight of the wheel hub 52. The through bore 58 enables common use of the wheel hub 52, after forging, between the bearing apparatus to support a driving wheel and to support a driven wheel. On the contrary, the through bore 58 in the wheel hub 52 also causes several problems such as reduction of rigidity of the wheel hub 52 especially at a region on the inboard side of the wheel hub 52 where a large moment load is applied. Thus, this reduces the strength and durability of the wheel hub 52.

If the rigidity of the cylindrical portion 52*b* is small, the cylindrical portion 52*b* near the caulked portion 52*c* would be deformed radially outward during the caulking process. Accordingly, the inner ring 53 would also be deformed radially outward and thus hoop stress is generated within the inner ring 53 which reduces the durability of the inner ring 53.

In addition, this kind of bearing apparatus is usually subjected to severe external environments above a road surface and frequently suffers from exposure to muddy water. Especially in coastal regions, the bearing apparatus is exposed to salt water. Further, in cold environments, it is exposed to muddy water which includes salt or anti-freezing agents. Since the inner ring 53 is exposed to these conditions, as a naked steel surface, it would become rusty. If the generation of rust progresses in the inner ring 53, it sustains a large hoop stress. Diffusive hydrogen present in the environment enters into the metallographic structure of the inner ring 53 and causes a so-called "delayed fracture" causing the hydrogen embrittlement which causes destruction of the metallic grain boundary.

SUMMARY OF THE INVENTION

It is, therefore, an object of the present invention to provide a vehicle wheel bearing apparatus which can reduce the weight and size of the wheel hub while keeping its high rigidity. Also, it can suppress a generation of hoop stress of the inner ring caused by the caulking process to obtain a desirable durability.

According to an object of the present invention, a vehicle bearing apparatus comprises an outer member formed with double row outer raceway surfaces on an inner peripheral surface. An inner member includes a wheel hub with an integrally formed wheel mounting flange at one end of the inner member. A cylindrical portion axially extends from the wheel mounting flange. At least one inner ring is formed with at least one of the double row inner raceway surfaces opposed to the double row outer raceway surfaces. The inner ring is adapted to be press-fit onto the cylindrical portion of the wheel hub. Double row rolling elements are freely rollably contained between the outer and inner raceway surfaces, respectively, of the outer and inner members. The inner ring is axially immovably secured relative to the wheel hub by a caulked portion by plastically deforming the end of the axially extending cylindrical portion radially outward. A partition wall is formed in the axially extending cylindrical portion of the wheel hub at a portion subjected to a load applied to at least the inner raceway surface of an inboard side of the double row inner raceway surfaces. A hollow portion is formed within the cylindrical portion at a portion outboard from the partition wall.

According to the invention, in a so-called self-retaining structure, the inner ring is secured on the wheel hub by plastically deforming the end of the cylindrical portion of the wheel hub. The partition wall is formed in the axially extending cylindrical portion of the wheel hub at a portion subjected to a load applied to at least the inner raceway surface of an inboard side of the double row inner raceway surfaces. The hollow portion is formed within the cylindrical portion at a portion outboard from the partition wall. Accordingly, it is possible to commonly use, as a forged part, a bearing apparatus to support a driving wheel only by punching out the partition wall and thus to reduce the manufacturing cost of the bearing apparatus.

In addition, the hollow portion enables weight reduction of the wheel hub and improves the heat radiation effect and thus its durability. Furthermore, the provision of the partition wall on the cylindrical portion of the wheel hub at a position to which the inner ring is press-fit enables an increase in the rigidity of the wheel hub. Thus, this improves the strength and durability of the wheel hub although a large moment load is applied to the bearing portion.

Furthermore, since the deformation of the cylindrical portion near the caulked portion is suppressed by the partition wall, the hoop stress generated in the inner ring can be also suppressed to a minimum. Thus, it is possible to prevent generation of a “delayed fracture” although the bearing is used under severe rusty environment conditions.

Preferably, according to the invention, the inner diameter of the hollow portion is set at a diameter of a prepared hole for a serration to be formed. This enables the wheel hub, as a forged part, to be commonly used for the bearing apparatus to support a driving wheel by only punching out the partition wall.

According to the invention, the hoop stress of the inner ring is limited to less than 300 MPa. This enables the invention to keep sufficient strength and durability of the inner ring.

According to the invention, a preservation film is formed on the surface of the inner ring. This prevents generation of rust on the naked portion of the inner ring exposed to the ambient environment.

Preferably, the preservation film is a plated layer formed from a zinc/nickel alloy. Since the zinc/nickel alloy is superior in corrosion resistance, it is possible to exhibit a strong rust resistive effect under severe environmental conditions. Also, high resistance against abrasion is attained by the high surface hardness of the zinc/nickel alloy.

According to the invention, sealing devices are arranged at both ends of an annular space formed between the outer and inner members. Such a structure enables a reduction in an amount of grease contained within the bearing apparatus. Thus, the weight and size of the bearing apparatus is reduced when compared with a conventional bearing apparatus where openings of the outer member are wholly closed by sealing caps. In addition, such a sealing device can be commonly used as a sealing device in the bearing apparatus to support a driving wheel. A cost reduction can be further enhanced by standardization of the bearing apparatus between those to support a driving wheel and a driven wheel.

EFFECTS OF THE INVENTION

The vehicle wheel bearing apparatus of the present invention comprises an outer member formed with double row outer raceway surfaces on its inner peripheral surface. An inner member includes a wheel hub with an integrally formed wheel mounting flange at one end of the inner member. A cylindrical portion axially extends from the wheel mounting flange. At least one inner ring, formed with at least one of the double row inner raceway surfaces, opposes the double row outer raceway surfaces. The inner ring is adapted to be press-fit onto the cylindrical portion of the wheel hub. Double row rolling elements are freely rollably contained between the outer and inner raceway surfaces, respectively, of the outer and inner members. The inner ring is axially immovably secured relative to the wheel hub by a caulked portion formed by plastically deforming the end of the axially extending cylindrical portion radially outward. A partition wall is formed in the axially extending cylindrical portion of the wheel hub at a portion subjected to a load applied to at least the inner raceway surface of an inboard side of the double row inner raceway surfaces. A hollow portion is formed within the cylindrical portion at a portion outboard from the partition wall. Accordingly, it is possible to commonly use, as a forged part, the bearing apparatus to support a driving wheel by only punching out the partition wall. Thus, this reduces the manufacturing cost of the bearing apparatus.

In addition, the hollow portion enables weight reduction of the wheel hub and improves the heat radiation effect and thus the durability. Furthermore, the partition wall on the cylindrical portion of the wheel hub at a position where the inner ring is press-fit, enables an increase in the rigidity of the wheel hub and thus improves the strength and durability of the wheel hub even though a large moment load is applied to the bearing portion.

Furthermore, since the deformation of the cylindrical portion near the caulked portion is suppressed by the partition wall, the hoop stress generated in the inner ring can also be suppressed to a minimum. Thus, it is possible to prevent generation of a “delayed fracture” which would be caused by penetration of diffusive hydrogen present in the environment into the metallographic structure of the inner ring even though the bearing is used under severe rusty environmental conditions.

To carry out the present invention, a vehicle wheel bearing apparatus comprises an outer member formed with double row outer raceway surfaces on its inner peripheral surface. An inner member includes a wheel hub with an integrally formed wheel mounting flange at one end of the inner member. A cylindrical portion axially extends from the wheel mounting flange. At least one inner ring is formed with at least one of the double row inner raceway surfaces opposed to the double row outer raceway surfaces. The inner ring is adapted to be press-fit onto the cylindrical portion of the wheel hub. Double row rolling elements are freely rollably contained between the outer and inner raceway surfaces, respectively, of the outer and inner members. The inner ring is axially immovably secured relative to the wheel hub by a caulked portion formed by plastically deforming the end of the axially extending cylindrical portion radially outward. A partition wall is formed in the axially extending cylindrical portion of the wheel hub at a portion subjected to a load applied to at least the inner raceway surface of an inboard side of the double row inner raceway surfaces. A hollow portion is formed within the cylindrical portion at a portion outboard from the partition wall.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Preferred embodiments of the present invention will be described with reference to accompanied drawings.

Figure 1:
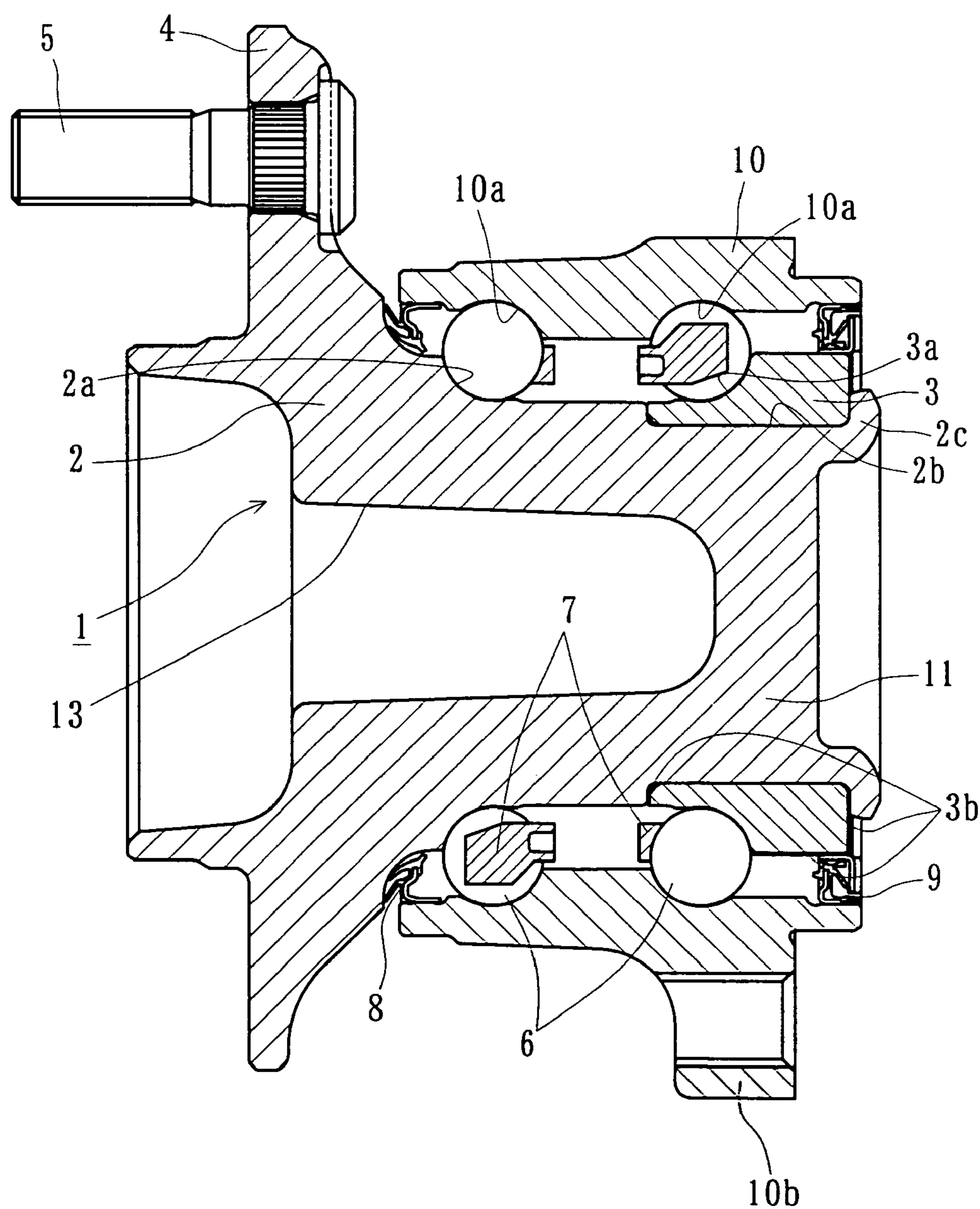
FIG. 1 is a longitudinal section view showing a first embodiment of a vehicle wheel bearing apparatus of the present invention.

FIG. 1 shows a first embodiment of a vehicle wheel bearing apparatus of the present invention. In the description below, a term "outboard side" of the apparatus denotes a side which is positioned outside of the vehicle body. The term "inboard side" of the apparatus denotes a side which is positioned inside of the body when the bearing apparatus is mounted on the vehicle body.

The vehicle wheel bearing apparatus comprises an inner member 1, an outer member 10, and a plurality of rolling elements (balls) 6 and 6 rollably contained between the outer and inner members 1 and 10. The inner member 1 includes a wheel hub 2 and an inner ring 3 press-fit on the wheel hub 2. The wheel hub 2 is integrally formed, at its outboard side end, with a wheel mounting flange 4 to mount a wheel (not shown) on the vehicle. Hub bolts 5, to secure the wheel, are arranged, via an equidistant space, along the circumference of the wheel mounting flange 4.

The wheel hub 2 has an inner raceway surface 2*a* on its outer circumferential surface and a cylindrical portion 2*b* axially extending from the inner raceway surface 2*a*. The inner ring 3 with an inner raceway surface 3*a* formed on its outer surface is press-fit on the cylindrical portion 2*b* of the wheel hub 2. The inner ring 3 is secured on the wheel hub 2 by a caulked portion 2*c*.

The caulked portion 2*c* is formed by plastically deforming the end of the axially extending cylindrical portion 2*b* radially outward to prevent the inner ring 3 from slipping off of the wheel hub 2. According to this embodiment, the adoption of a so-called self-retaining structure, enables control of the preload of the bearing without using any fastening means, such as a nut, and thus makes it easy to assemble the bearing to a vehicle and to maintain the preload for a long term.

The outer member 10 is integrally formed with a body mounting flange 10*b* and has double row outer raceway surfaces 10*a* and 10*a* on its inner circumferential surface. Double row rolling elements 6 and 6 are contained between the double row outer raceway surfaces 10*a*, 10*a* and the opposing inner raceway surfaces 2*a*, 3*a*. The double row rolling elements 6 and 6 are freely rollably supported by cages 7 and 7. Sealing devices 8 and 9 are arranged at either ends of the outer member 10 to prevent leakage of grease contained within the bearing apparatus and immigration of rain water or dusts from the outside into the bearing apparatus.

Although a bearing apparatus of the so-called third generation type is shown in the drawings where the inner raceway surface 2*a* is formed directly on the outer circumferential surface of the wheel hub, it will be appreciated that the present invention is not limited to such a third generation type and is applicable to the first and second generation types where a pair of inner rings are press-fit onto the axially extending cylindrical portion of the wheel hub. Also, although a double row angular ball bearing with balls 6 and 6 as rolling elements is shown, it may be replaced by, for example, a double row conical rolling bearing with conical rollers as rolling elements.

The wheel hub 2 is made of medium carbon steel such as S53C including carbon of 0.40~0.80% by weight. The outboard side inner raceway surface 2*a*, seal land portion to which the outboard side sealing device 8 contacts, and the axially extending cylindrical portion 2*b* of the wheel hub 2 are surface hardened by high frequency induction quenching to have a surface hardness of 58~64 HRC. The caulked portion 2*c* remains as a non-quenched portion with its surface hardness less than 25 HRC after forging. The inner ring 3 is made of high carbon chrome bearing steel such as SUJ 2 and is hardened to its core by quenching to have a hardness of 58~64 HRC.

The outer member 10 is made of medium carbon steel including carbon of 0.40~0.80% by weight such as S53C. The double row outer raceway surfaces 10*a* and 10*a* as well as the inner circumferential surface, at its ends into which sealing devices 8 and 9 are fitted, are hardened by high frequency induction quenching to have a surface hardness of 58~64 HRC.

Figure 2:
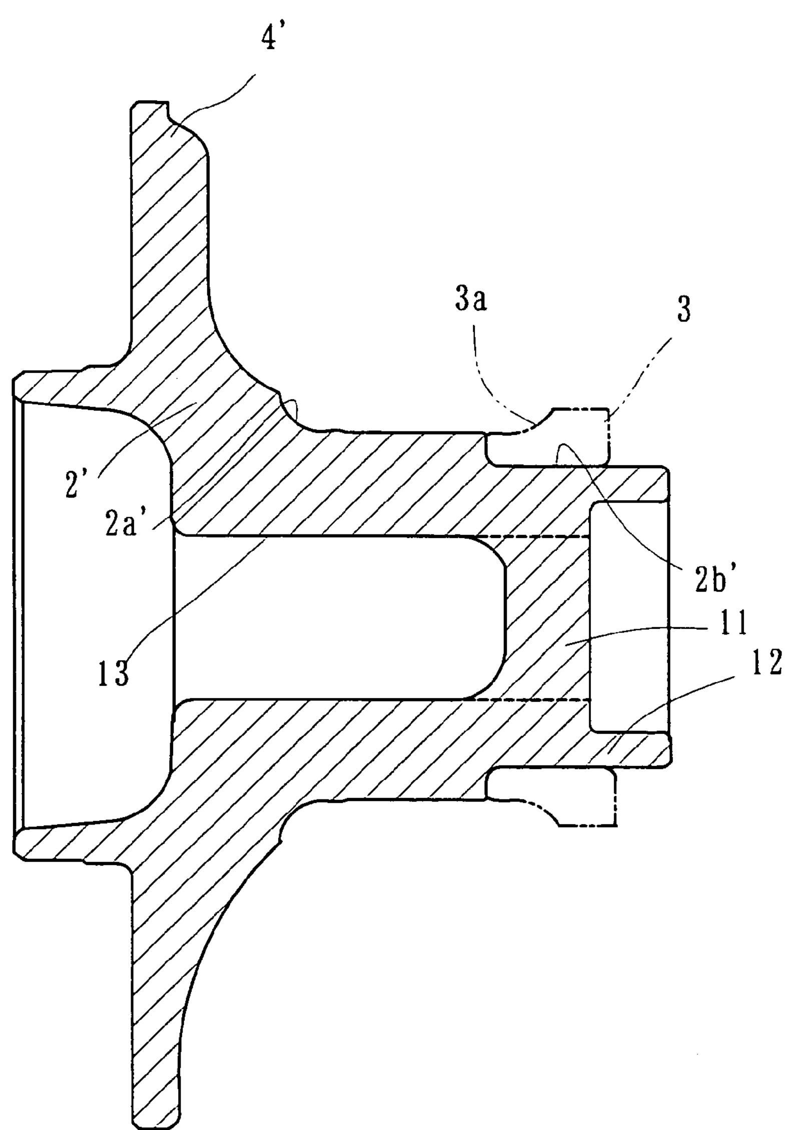
FIG. 2 is a longitudinal section view showing a wheel hub after forging.

FIG. 2 is a longitudinal section view showing a wheel hub 2' after forging. The wheel hub 2' is integrally formed at one end with a wheel mounting flange 4'. An outboard side inner raceway surface 2*a*' is on its outer circumferential surface. A cylindrical portion 2*b*' axially extends from the inner raceway surface 2*a*'. The wheel hub 2' is further integrally formed with a partition wall in the axially extending cylindrical portion 2*b*' of the wheel hub 2' at a portion subjected to a load applied to at least the inner ring 3. A hollow portion 13 is formed within the cylindrical portion 2*b*' at the outboard side of the partition wall 11. A cylindrically projected portion 12, for forming the caulked portion 2*c*, extends from the cylindrical portion 2*b*' toward the inboard side. It is preferable to provide a draft of 5~10° in the hollow portion 13 for forging.

The inner diameter of the hollow portion 13 is set at a diameter of a prepared hole for a serration to be formed herein to commonly use this wheel hub 2' as a bearing apparatus to support a driving wheel. This enables the wheel hub 2', as a forged part, to be commonly used for the bearing apparatus to support a driving wheel by only punching out the partition wall 11. When this wheel hub 2' is used in a bearing apparatus for a driving wheel, the partition wall 11 is punched out. Thus, a through bore is formed at the center of the wheel hub 2'. However, sufficient strength and durability of the wheel hub 2' can be kept since the momentum load applied to the cylindrical portion 2*b*' can also be supported by a stem portion of an outer joint member forming a constant velocity universal joint which is inserted into the hollow portion 13.

As previously described with reference to FIG. 1, the hollow portion 13 at the center of the wheel hub 2 enables weight reduction of the wheel hub 2 and improves the heat radiation effect and thus the durability. Furthermore, the partition wall 11 on the cylindrical portion 2*b* of the wheel hub 2, at a position where the inner ring 3 is press-fit, increases the rigidity of the wheel hub 2 and thus improves the strength and durability of the wheel hub 2 although a large momentum load is applied onto the bearing portion.

Furthermore, since the deformation of the cylindrical portion 2*b* near the caulked portion 2*c* is suppressed by the partition wall 11, the hoop stress generated in the inner ring 3 can also be suppressed to a minimum. The proportion of the inner ring 3, the thickness of the caulked portion 2*c*, and the caulking load etc. are appropriately set so that the hoop stress generated within the inner ring 3 is limited to less than 300 MPa. Thus, it is possible to prevent generation of a "delayed fracture" which would be caused by penetration of diffusive hydrogen present in the environment into the metallographic structure of the inner ring although the bearing is used under severe rusty environmental conditions.

In order to prevent generation of rust by salt present in the environment on a naked part of the inner ring 3, it is preferable to form, on the surface of the inner ring 3, a plated layer of zinc/nickel alloy after width grinding of the inner ring 3. A preservation film 3*b* of zinc/nickel alloy, superior in corrosion resistance, can be formed on the outer circumferential surface and the width surface of the inner ring 3 by grinding the inner raceway surface 3*a* and the inner circumferential surface of the inner ring 3. It is preferable that the zinc/nickel alloy is a colored chromate including 5~10% nickel. Since the zinc/nickel alloy has a higher surface hardness and abrasion resistance than the zinc plate etc, it is desirable to have the film thickness of more than 6~10 μm. However it is usually limited to less than 5 μm due to a reason in accuracy.

Figure 3:
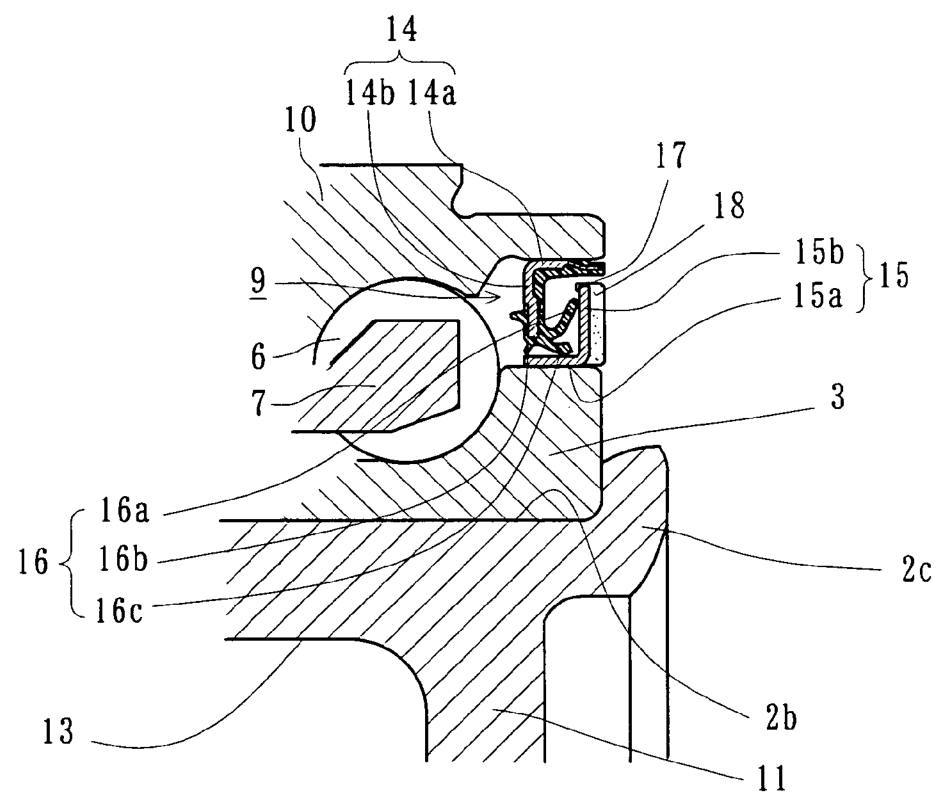
FIG. 3 is a partially enlarged section view showing a seal device on the outboard side in FIG. 1.
Figure 4:
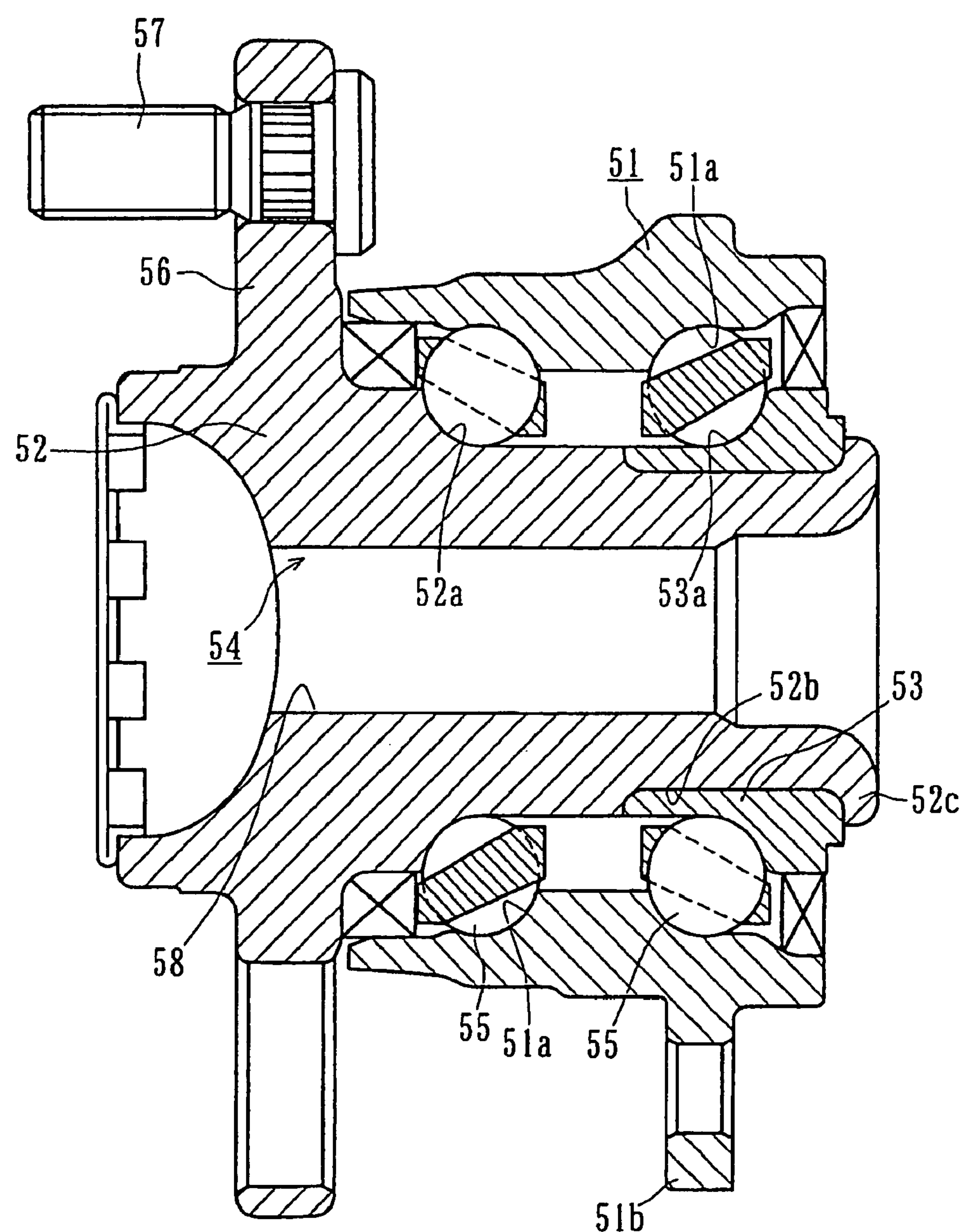
FIG. 4 is a longitudinal section view of a prior art vehicle wheel bearing apparatus.

As shown in FIG. 3, the inboard side sealing device 9 includes a first sealing plate 14 and a second sealing plate 15 fitted, respectively, on the outer member 10 and the inner ring 3. Each sealing plate 14 and 15 has a substantially "L-shaped" cross section and are oppositely arranged toward each other. The second sealing plate 15 comprises a cylindrical portion 15*a* fitted on the inner ring 3. An upstanding portion 15*b* extends radially outward from the cylindrical portion 15*a*. The second sealing plate 15 is made of ferrite-stainless steel sheet (JIS SUS 430 etc.) or cold rolled steel sheet (JIS SPCC etc.). The second sealing plate 15 is press-formed to have an L-shaped configuration cross section and be wholly annular.

On the other hand, the first sealing plate 14 comprises a cylindrical portion 14*a* fitted on the outer member 10. An upstanding portion 14*b* extends radially inward from the cylindrical portion 14*a*. A sealing member 16 comprises a side lip 16*a*, a grease lip 16*b* and an intermediate lip 16*c*. All lips are made from an elastomer material, such as rubber, which is bonded to the first sealing plate, via vulcanization.

The side lip 16*a* slidably contacts the upstanding portion 15*b* of the sealing plate 15. The grease lip 16*b* and the intermediate lip 16*c* contact the cylindrical portion 15*a* of the second sealing plate 15. A labyrinth seal 17 is formed by a small radial gap between the cylindrical portion 14*a* of the first sealing plate 14 and the upstanding portion 15*b* of the second sealing plate 15. A magnetic encoder 18, formed by an elastomer such as rubber mingled with magnetic powder, such as ferrite, is bonded, via vulcanization, to the inboard side surface of the upstanding portion 15*b*. The magnetic encoder 18 is an annular disc in which N and S poles are alternately magnetized at a predetermined pitch along its circumferential direction and forms a magnetic rotary encoder to detect the rotation speed of a wheel.

According to the present invention, such a sealing device 9 is arranged so as to close an opening formed between the outer member 10 and the inner ring 3. Such a structure enables a reduction in the amount of grease contained within the bearing apparatus. Thus, the weight and size of the bearing apparatus is reduced when compared with a conventional bearing apparatus where openings of the outer member are wholly closed by sealing caps. In addition, since such a sealing device can be commonly used as a sealing device in the bearing apparatus to support a driving wheel, cost reduction can be further enhanced by standardization of the bearing apparatus between that for supporting a driving wheel and that for a driven wheel.

The vehicle wheel bearing apparatus can be applied to any one of the first through third generations of a so-called self-retain structure where the inner ring is press-fit onto the cylindrical portion of the wheel hub. The inner ring is secured on the wheel hub by plastically deforming the end of the cylindrical portion of the wheel hub.

The present invention has been described with reference to the preferred embodiments. Obviously, modifications and alternations will occur to those of ordinary skill in the art upon reading and understanding the preceding detailed description. It is intended that the present invention be construed as including all such alternations and modifications insofar as they come within the scope of the appended claims or the equivalents thereof.

What is claimed is:

1. A vehicle bearing apparatus comprising:

an outer member formed with double row outer raceway surfaces on an inner peripheral surface;

an inner member including a wheel hub having an integrally formed wheel mounting flange at one end of the inner member, a cylindrical portion axially extending from the wheel mounting flange, one inner ring formed with one of double row inner raceway surfaces opposing the double row outer raceway surfaces and adapted to be press-fit onto the cylindrical portion of the wheel hub;

double row rolling elements freely rollably contained between the outer and inner raceway surfaces, respectively, of the outer and inner members, the inner ring being axially immovably secured relative to the wheel hub by a caulked portion formed by plastically deforming the end of the axially extending cylindrical portion radially outward and forming a hoop stress in the inner ring, said hoop stress is limited to less than 300 MPa preventing the generation of a delayed fracture in said inner ring;

a partition wall formed in the axially extending cylindrical portion of the wheel hub, said partition wall positioned immediately below the center of the inner ring on the inboard side in an axial direction, said partition wall positioned to be subjected to a load applied to the inner raceway surface of an inboard side raceway surface of the double row inner raceway surfaces so that the partition wall directly receives the load that is generated in the bearing along the bearing contact angle and a hollow portion formed within the cylindrical portion at a portion outboard from the partition wall.

2. The vehicle wheel bearing apparatus according to claim 1, wherein the inner diameter of the hollow portion is set at a diameter of a prepared hole for a to be formed serration.

3. The vehicle wheel bearing apparatus according to claim 1, wherein a preservation film is formed on the surface of the inner ring.

4. The vehicle wheel bearing apparatus according to claim 3, wherein the preservation film is a plated layer formed from zinc/nickel alloy.

5. The vehicle wheel bearing apparatus according to claim 1, wherein sealing devices are arranged at both ends of an annular space formed between the outer and inner members.

* * * * *